J. W. STREET.
Cattle Car.
No. 96,362. Patented Nov. 2, 1869.
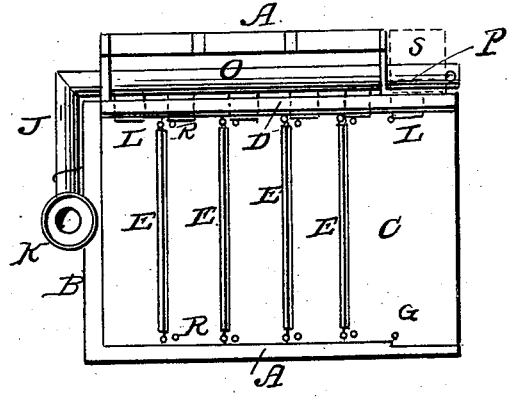
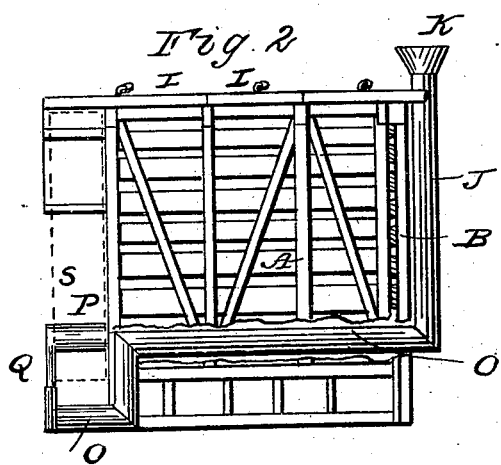
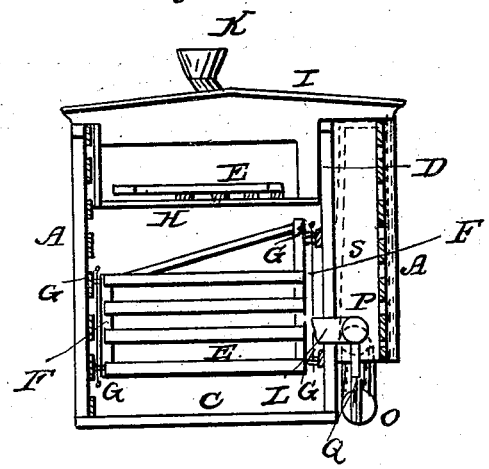
Witnesses
Inventor
John W Street.
By his Atty J Dennis jr.

United States Patent Office.

JOHN W. STREET, OF MARSHALLTOWN, IOWA.

IMPROVED RAILWAY CATTLE-CAR.

Specification forming part of Letters Patent No. 96,362, dated November 2, 1869.

*To all whom it may concern:*

Be it known that I, JOHN W. STREET, of Marshalltown, Marshall county, in the State of Iowa, have invented certain new and useful Improvements in Cars for Transporting Cattle; and I hereby declare the following to be a full and exact description thereof, reference being had to the accompanying drawings, forming part of this specification.

The nature or essence of my invention consists in dividing a car for the transportation of cattle, horses, and other large animals into separate stalls by means of gates hinged and detachable at both ends, and arranging a feed-bin in the top of the car, so that feed may be let fall therefrom at one side directly into boxes or mangers at the ends of the stalls; also, in providing a reservoir or pipe arranged to receive water at or near the top of the car and supply it to troughs or basins in the several stalls for the animals to drink.

In the drawings hereinbefore mentioned, Figure 1 is a plan of one-half of a long or eight-wheeled car with my improvements, the top being removed to show the interior. Fig. 2 is a side elevation of the same, and Fig. 3 an end view.

In these drawings, A A are the sides of the car; B, the end, and C the floor.

D is an interior vertical frame, dividing off a space along one side of the car for the drinking and feed apparatus.

The gates E E are supported at each end by hinges formed by the rods F passing down through the eyes or staples G, fixed in the ends of the gates, and in the frame D and the side of the car.

H is an upper floor, arranged at some distance below the roof, but high enough to be out of the way of the animals' heads, to form a bin or store-room for feed. It may be filled through the doors or hatches I I in the roof, and the feed supplied to the animals, as required, by dropping it down between the frame D and the side of the car into feed-boxes or mangers at the ends of the stalls, openings or trap-doors being provided for that purpose in the floor of the feed-room. I contemplate the use of a pipe having a funnel-top to receive grain or other short feed and convey it down from the feed-room into the boxes or mangers in the stalls.

J is a water-pipe having a funnel-top, K, to receive water from the same hose or pipe that the engine-tank is filled from, and arranged at the top of the car near the middle line of the train, so as to be filled with equal facility from either side. Near the bottom of the car it connects with a horizontal pipe or reservoir, O, extending through the car between the side and the frame D, and having attached to it troughs or basins L, one in each stall, with openings into them from the reservoir to supply water to the animals in the stalls. The reservoir O should be provided with a waste-way, so that when filled to a level somewhat below the upper edges of the troughs any further supply will escape without causing the troughs to overflow into the stalls or upon the floor of the car. The pipes J on each pair of cars are to be arranged on the adjacent ends of the two cars, so that both may be filled or supplied from the station-tank without moving the train. At the door of the car the pipe or reservoir O is bent twice at right angles to pass under the doorway, whence it rises again in the same manner, so as to be continuous from end to end of the car without obstructing the doorway. A short supplementary detachable reservoir, P, connecting with the main reservoir by the pipe Q, is arranged across the doorway to supply water to the stalls opposite, and to be removed whenever the doorway is required to be open for use. That portion of the reservoir O beneath the doorway may be inclosed in a case or box, in which, during the winter season, a stove may be placed to keep the water from freezing, the water heated and expanded in this lower part naturally rising into the higher portions.

As the gates E E are hung on loose or detachable hinges at both ends, either end may be released to swing around, according to the side at which it may be desirable to load or unload; and when it is required to have the car-body clear for other freight both ends of the gates may be detached, and they may then be stowed away in the feed room or bin in the top of the car, as shown.

R R are additional eyes or staples in the side of the car and in the frame D, by the use of which the width of certain stalls may be increased or diminished to adapt them to animals of different sizes.

At S is shown in dotted lines a portion of a door provided with an inner frame nearly corresponding to the frame D, within which the small reservoir P is to be placed, the connecting-pipe Q passing down through the bottom.

Having given a full description of my invention and improvements, what I claim, and desire to secure by Letters Patent, is—

1. Dividing a car for the transportation of animals into stalls by swinging gates or partitions hinged with detachable hinges at both ends, so that either end can be swung around to admit the animal or to release him from the stall, and so that both ends of the gate may be detached to clear the car for common freight, substantially as described.

2. Arranging a store-room or feed-bin in the top of the car, provided with doors or hatches in the roof for filling the same, and with openings through its floor at the side of the car for dropping the feed into mangers or feed-boxes in the ends of the stalls below, substantially as described.

3. The arrangement of the reservoir O in the side of the car at a suitable height to supply water to the drinking troughs or basin without the use of a pipe and stop-cock, substantially as described.

4. The arrangement of the troughs L with reference to the reservoir O, whereby the water may be allowed to flow freely through openings in the side of the reservoir into the troughs and stand at the same level in both, substantially as described.

5. The arrangement of the reservoir O, whereby it is made to convey water from end to end of the car without obstructing the doorway, by passing under the same, substantially as set forth.

JOHN W. STREET.

Witnesses:
B. L. BURRITT,
ALVIN LAMB.